United States Patent [19]

Rundquist et al.

[11] Patent Number: 5,667,575
[45] Date of Patent: Sep. 16, 1997

[54] PROCESS FOR REDUCING THE COLOR OF AN EMULSION CONTAINING FUNCTIONALIZED POLYOLEFIN WAX

[75] Inventors: Paul Andrew Rundquist, Mt. Carmel; Ernest Phillip Smith, Blountville; Stephen Louis Poteat, Gray; Dante Joseph Rutstrom, Kingsport, all of Tenn.; Richard Kingsley Stuart, Jr., Longview, Tex.

[73] Assignee: Eastman Chemical Company, Kingsport, Tenn.

[21] Appl. No.: 531,989

[22] Filed: Sep. 21, 1995

[51] Int. Cl.$^6$ ............................................. C09D 191/06
[52] U.S. Cl. .................................... 106/271; 106/3
[58] Field of Search ................................. 106/3, 271

[56] References Cited

U.S. PATENT DOCUMENTS

| | | |
|---|---|---|
| 2,045,455 | 6/1936 | Flint. |
| 2,879,239 | 3/1959 | Groote et al.. |
| 3,329,667 | 7/1967 | Braude et al.. |
| 3,480,580 | 11/1969 | Joyner et al.. |
| 3,496,150 | 2/1970 | Kropp. |
| 3,519,588 | 7/1970 | Hagemeyer et al.. |
| 3,600,366 | 8/1971 | Heckert. |
| 3,642,722 | 2/1972 | Knowles et al.. |
| 4,315,863 | 2/1982 | Tomoshige et al. .............. 106/271 |
| 4,525,580 | 6/1985 | Baker .............................. 528/490 |
| 4,613,679 | 9/1986 | Mainord .......................... 560/190 |
| 4,632,955 | 12/1986 | Cook .............................. 524/275 |
| 4,720,540 | 1/1988 | Maresca et al. ................. 528/482 |
| 4,915,785 | 4/1990 | Siminoski et al. ............... 162/78 |
| 4,959,468 | 9/1990 | Ravi et al. ....................... 536/127 |
| 5,292,864 | 3/1994 | Wood et al. ..................... 528/490 |
| 5,360,862 | 11/1994 | Roberts et al. .................. 524/560 |

OTHER PUBLICATIONS

Kirk-Othmer Encylcopedia of Chemical Technology, 3rd Ed. (Wiley, NY, 1980) no month avail.

*Primary Examiner*—David Brunsman
*Attorney, Agent, or Firm*—Mark A. Montgomery; Harry J. Gwinnell

[57] ABSTRACT

Disclosed herein is a method for reducing the color of an emulsion of functionalized polyolefin wax by treating an emulsion with a water soluble oxidizing agent at a temperature above the freezing point and below the boiling point of the emulsion and below the softening point of the wax. Disclosed herein, also, is the essentially colorless emulsion produced according to the disclosed method which is useful as an additive to floor polishes and other coating products.

15 Claims, No Drawings

PROCESS FOR REDUCING THE COLOR OF AN EMULSION CONTAINING FUNCTIONALIZED POLYOLEFIN WAX

FIELD OF THE INVENTION

The present invention relates to a novel process for reducing the color of an emulsion of polyolefin wax. More particularly, the present invention relates to a novel process for reducing the color of an emulsion of functionalized polyolefin wax without reducing the application performance properties of the wax emulsion.

BACKGROUND OF THE INVENTION

Emulsions and dispersions of many natural and synthetic waxes are used as additives in a variety of applications. U.S. Pat. No. 2,045,455 teaches how to prepare fine particle size emulsions of carnauba wax in water with the aid of surfactant. Since the emulsification process is practiced at temperatures greater than the melt temperature of the wax, the resultant fine particle dispersions are often referred to as "wax emulsions" rather than "wax dispersions." This distinction reflects the fact that the system was prepared by combining two immiscible liquids. However, when cooled, the wax droplets become dispersed solid particles. Wax emulsions are referred to as nonionic, anionic, or cationic, depending on the nature of the surfactant used to prepare the emulsion.

In the floor polish industry, it is desirable to use wax emulsions having both fine particle size and narrow size distribution of the dispersed wax as additives in floor polish formulations to improve the durability, buffability, scuff resistance, and slip resistance of a dried film of the end floor polish product on a floor. Fine particle wax emulsions, especially emulsions of functionalized synthetic polyolefin waxes, are common additives in floor polish formulations.

Functionalized polyolefin waxes which are easily emulsified into the particles having fine size and narrow size distribution are prepared by functionalizing the wax according to methods such as oxidation and maleation to make the wax more hydrophilic. "Functionalized polyolefin waxes" as used herein refers to either a homopolymeric or heteropolymeric polyolefin molecule which has been altered by the free radical or other type of addition or grafting of a hydrophilic side chain onto the hydrophobic polyolefin backbone, wherein the side chain group could be derived from a single molecule or an oligomer of an acid or anhydride functional species such as acrylic acid or maleic anhydride, and the like. Heteropolymeric polyolefin molecules are copolymers which typically contain one alpha-olefin copolymerized with another polyolefin, usually a minor amount, such as a copolymer of ethylene containing up to 10 weight percent of another alpha-olefin. Functionalized waxes, prepared either through air oxidation with or without a catalyst, or by reaction with acid or anhydride functional species such as acrylic acid or maleic anhydride, are easily emulsified as fine sized particles in water with the aid of surfactants. Air oxidation results in the formation of polar carboxylic acid groups covalently bound to the wax. Examples of air oxidized polyolefins and air oxidation processes are disclosed in U.S. Pat. Nos. 2,879,239; 3,519,588 and 3,329,667. Reaction with maleic anhydride, commonly called "maleation," results in the formation of hydrophilic dicarboxylic acid/anhydride groups covalently bound to the wax. Examples of maleated polyolefins are disclosed in U.S. Pat. Nos. 3,480,580 and 3,642,722. The functionality of the synthetic waxes used to prepare wax emulsions is crucial for determining end-product application performance of the emulsion.

Emulsions having the application performance properties required for use as floor polish additives or similar coating applications contain functionalized polyolefin wax typically having a molecular weight greater than 1,000. A problem commonly encountered with functionalized wax emulsions, especially emulsions of functionalized polyolefin wax having a molecular weight greater than 1,000, is undesirable yellowish-brown color. Floor polish products having a substantially colorless or water-white color are generally preferred by consumers. Even a lightly colored emulsion that merely appears dirty or dingy is considered to be colored since it is aesthetically unpleasant. Since color of individual ingredients in a formulation can affect the overall color of the end floor polish product, emulsion color is a critical criterion for marketability of a wax emulsion as a floor polish additive. Strictly controlled emulsification conditions and the addition of sodium metabisulfite, a reducing agent, are known to somewhat minimize the color of wax emulsions. However, even with strictly controlled conditions, the functionalized polyolefin wax emulsion is still colored, too highly colored for general consumer acceptance.

An approximately 25 percent solids non-ionic emulsion of AC-540, an ethylene/acrylic copolymer wax from Allied Signal, Inc., has a bluish-white translucent appearance. Yet this emulsion of an ethylene/acrylic copolymer wax does not produce a dried film having the durability, buffability, scuff resistance and slip resistance properties associated with emulsions of funstionalized polyolefin waxes.

The recipes for successfully preparing fine particle size, narrow size distribution emulsions are very well defined. Large deviations from the recipes will result in significant increases in average particle size resulting in emulsions with poor application performance properties and having limited commercial use.

U.S. Pat. No. 3,496,150 (polymaleates); U.S. Pat. No. 3,600,366 (polymaleates); U.S. Pat. No. 4,959,468 (glycosides);U.S. Pat. No. 4,720,540 (thermoplastics); 5,292,864 (polyaspartic acid) and U.S. Pat. No. 4,525,580 (glyoosides) require that the colored polymer be dissolved in either an aqueous solution or an organic solution prior to contact with an aqueous bleaching agent. These disclosed processes for reducing the color of non-polyolefin polymers require that the polymer be in a single-phase system, such as a molten polymer or a polymer dissolved in an inert solvent, prior to the bleaching process. None of these processes are suitable for reducing the color of a two-phase wax emulsion.

In light of the above, it would be very desirable to be able to reduce the color of emulsions of functionalized polyolefin waxes without reducing their application performance properties.

SUMMARY OF INVENTION

The present invention is a method of treating a colored emulsion of functionalized polyolefin wax with a water soluble oxidizing agent at a temperature which is above the freezing point of the emulsion and below both the boiling point of the emulsion and the softening point of the wax for a time sufficient to affect a significant reduction in emulsion color. Another aspect of this invention is the novel essentially colorless emulsion of functionalized polyolefin wax, produced according to this new method, which exhibits essentially the same application performance properties as it would have prior to the color reduction process.

DETAILED DESCRIPTION OF THE INVENTION

The applicants have unexpectedly discovered a process for significantly reducing the color of an emulsion of functionalized polyolefin wax. The treatment of an emulsion of functionalized polyolefin wax according to this process not only reduces color but does so while maintaining the application performance properties of the wax emulsion. The applicants also unexpectedly discovered that the extraction of color from functionalized wax prior to emulsification does not produce an uncolored emulsion. They discovered that the emulsification process itself, in addition to the functionalization process, adds color to the wax contained in the emulsion. For that reason, it is important that this novel process for decolorizing a wax emulsion be conducted subsequent to the emulsification process.

The process according to the present invention yields a wax emulsion which can be used as an additive in floor polish formulations to give a highly desirable essentially colorless end product floor polish which also has a high degree of durability, buffability, scuff resistance and slip resistance as an applied and dried film of floor polish. The essentially colorless emulsion produced according to this process can also be used in applications other than floor polish.

The significant reduction of emulsion color attained through this process was particularly unexpected due to the fact that the colored hydrophobic wax is in the form of solid particles suspended in an aqueous emulsion at the time that the emulsion is treated by the addition of the water soluble oxidizing agent to the emulsion. Also, irradiation with ultraviolet light is not necessary if the emulsion is decolorized according to the process of the present invention.

The present invention is a method of reducing the color of a wax emulsion, comprising treating a wax emulsion with a water soluble oxidizing agent at a temperature above the freezing point and below the boiling point of the emulsion and below the softening point of the wax, wherein the wax emulsion contains functionalized polyolefin wax, water and surfactant.

The novel process of the present invention can be used to significantly decolorize an emulsion of functionalized polyolefin wax. The applicants have found that there is a strong correlation between the color of the functionalized wax prior to emulsification and emulsion color. However, colorless functionalized waxes do not produce colorless emulsions.

In emulsions made for use as floor polish additives, the waxes most envisioned to be used in industry are those functionalized waxes which are most easily emulsified into fine-sized particles with narrow size distribution. For those reasons, maleated polypropylene and oxidized polyethylene are the preferred waxes for use with the present invention. However, this process is especially advantageous due to its broad applicability. The specific functionality and process of functionalizing the wax does not limit the use of this novel process, as long as the functionalized wax is emulsifiable. Typically, functionalized polyethylene must have an acid number greater than 10 and functionalized polypropylene must have an acid number greater than 30 to be emulsifiable.

While it is possible to prepare an emulsion containing a very small weight percent of wax and other solids, it is contemplated that this invention will be used to treat the generally preferred formulations of emulsions of functionalized polyolefin wax containing between about 30 weight percent and 45 percent solids, based on the total emulsion weight. However, the higher solids content the better, so long as the emulsion is stable. A preferred emulsion of functionalized polyolefin wax to be treated with this process will have an average particle diameter of less than 0.1 micron and a polydispersity value less than 0.5 when measured by dynamic light scattering. "Polydispersity," as used herein, is defined by dividing the second cumulant of the intensity autocorrelation function by the square of the first cumulant. The more preferred emulsified maleated polypropylene wax has an average particle diameter of 0.04 to 0.08 micron, while the more preferred emulsified oxidized polyethylene wax typically has an average particle diameter of 0.02 to 0.06 micron.

Wax emulsions are referred to as nonionic, anionic or cationic, depending on the nature of the surfactant used to prepare the emulsion. The surfactants most preferred include ethoxylated nonylphenol and ethoxylated linear or secondary alcohols. In the case of nonionic and anionic wax emulsions, a strong base such as sodium or potassium hydroxide is typically used in the formulation to neutralize the wax acid functionality and enhance the hydrophilic nature of the wax. The resulting emulsion will have a pH above 8, often between a pH of 9 and 11. Anionic emulsions are generally very highly colored. For these reasons, it is generally preferred for this process to be carried out using a nonionic wax emulsion. This process is also preferably carried out in the substantial absence of amines in both anionic and nonionic systems, since amines render the process substantially less efficient.

Other materials may also be present in the functionalized wax emulsion as long as they do not significantly interfere with the decolorizing process. The presence of strong reducing agents such as sodium metabisulfite, commonly used in wax emulsions to improve translucency through decreased particle size and to somewhat lower the color, does not interfere with the applicability of the present invention. Other typical materials which may be present in emulsions used with this process include biocides, fungicides and antifoam agents.

It is essential that the pH of nonionic emulsions treated according to the process of the present invention remains above about 8. The applicants have found that emulsions tend to become highly viscous and gel at a pH below 8. This physical change would likely signify a change in the application performance properties of the wax emulsion.

Peroxygen-type bleaches, those which can form hydrogen peroxide when dissolved in water, and chlorine-type bleaches were the oxidizing agents found most effective to reduce emulsion color. Examples of oxidizing agents used in treating wax emulsions in the present invention are the water soluble peroxides, hypochlorites, perborates, persulfates, ozone and peracetic acid. The monohydrate perborates are preferred over tetrahydrate perborates. "Water soluble," as used in this application, refers to materials which dissolve in water, with or without the presence of a small excess of undissolved particulates. Ozone is generally bubbled through the emulsion. Peracetic acid is the least desirable of the useful oxidizing agents since its strong acidity could harm the stability of the emulsion by lowering the pH below 8. In the preferred embodiment of the present invention, oxidizing agents include hydrogen peroxide and alkali metal salts of peroxide, hypochlorite, perborate and persulfate, with the sodium and potassium salts being the preferred alkali metal salts. In the more preferred embodiment of the present invention, oxidizing agents include hydrogen peroxide and sodium hypochlorite. However, hydrogen peroxide is the most preferred oxidizing agent since hydrogen peroxide reduces emulsion color more effectively than sodium hypochlorite, is especially safe to work with in aqueous solution, is easily available, and has such environmentally friendly decomposition products.

The following are preferred concentrations of examples of the oxidizing agents used in this process, reported in weight percent, based on the total emulsion weight: between 0.1 percent and 20 weight percent hydrogen peroxide, preferably between 0.3 percent and 3 weight percent, most preferably between 1 percent and 2 weight percent; between 0.1 percent and 10 weight percent peroxide salt, preferably between 0.1 percent and 5 weight percent; between 0.1 percent and 30 weight percent hypochlorite salt; between 0.1 percent and 10 weight percent perborate salt, preferably between 0.1 percent and 5 weight percent; between 0.1 percent and 10 weight percent persulfate salt, preferably between 0.1 percent and 5 weight percent; between about $2.4 \times 10^{-2}$ moles/hour and about $9.6 \times 10^{-2}$ moles/hour ozone continuously bubbled into each 100 mL of emulsion (continuous bubbling is necessary since ozone is not stable in alkaline solution); between 0.1 percent and 20 weight percent peracetic acid, preferably between 0.3 percent and 3 weight percent, most preferably between 1 percent and 2 weight percent. However, the concentration of peracetic acid should not exceed that amount which would lower the pH of the emulsion below 8. The upper limit of the concentration of hydrogen peroxide in the most preferred embodiment is 2 weight percent, even though more hydrogen peroxide would have a better bleaching affect. This preferred upper limit is due to pressure build-up constraints of most commercial pressure equipment and the typical undesirable bubbling out of oxygen gas when more than 2 weight percent hydrogen peroxide is used to treat emulsions at atmospheric pressure.

The practice of this invention, using hydrogen peroxide as the oxidizing agent as an illustrative example, consists of adding an aqueous solution of 30 percent hydrogen peroxide to the previously prepared emulsion of functionalized polyolefin wax in a suitable stirred vessel which is either open or closed to the atmosphere, and with the emulsion at the temperature of optimum color reduction. The wax emulsion/ hydrogen peroxide mixture is then left stirring for a suitable time to reduce the emulsion color. The exact method of introduction of the hydrogen peroxide solution to the emulsion is not critical, but stirring upon introduction is recommended to keep from shocking the system. In fact, this process can be practiced by the addition of the oxidizing agent or bleach during the emulsification cool-down cycle. It is important, however, that the introduction of the oxidizing agent occur after the formation of the wax emulsion. Also, the oxidizing agent should not be present during formation of the wax emulsion.

The optimum time required to effect significant color reduction depends upon the nature of the oxidizing agent, the agent concentration in the wax emulsion, and the emulsion temperature. The bleaching effect begins immediately upon introduction of the oxidizing agent into the emulsion. However, the reaction time is preferably between 5 minutes and seven days. At least 5 minutes of mixing is generally needed for the oxidizing agent to have contact with a significant amount of wax and it is generally impractical to run a reaction for more than 7 days. The reaction time is more preferably between 5 and 90 minutes, most preferably between 10 and 40 minutes. A minor amount of oxidizing agent can remain in the emulsion for extended periods and slightly reduce the color over time. It should be noted, however, that a significant amount of oxidizing agent should not remain in the emulsion when it will be stored for any significant length of time due to the dangerous accumulation of oxygen.

The temperature range for this process is between above the freezing point and below the boiling point of the emulsion and below the softening point of the wax. Besides the fact that oxidizing agents cannot be adequately mixed into a frozen emulsion, it may negatively affect the emulsion application performance to actually freeze the emulsion during the color reduction process. Likewise, temperatures above the boiling point of water or above the softening point of the wax can be detrimental to the emulsion due to changing the emulsion balance upon evaporation of water and/or negative affects to the application performance of the emulsion upon softening of the wax. The optimum conditions of temperature, concentration, and time will depend on the specific oxidizing agent used. In the preferred embodiment, the emulsion is heated to a temperature of between about 50° C. and about 90° C., most preferably between about 60° C. and about 80° C. This heat is preferably residual heat that was added to the emulsion system during the formation of the emulsion and the decolorization takes place during cool down.

Controlled pressure is not required for the practice of this invention as long as the temperature is kept within an acceptable range. This invention can be practiced at ambient atmospheric pressure with an open vessel or at controlled pressure in a closed vessel. If a closed vessel is used, it should be suitably pressure rated when peroxygen-type bleaching agents are used due to the fact that decomposition of the bleaching agent occurs with release of oxygen gas.

The process for reducing the color of emulsions of functionalized polyolefin waxes can be practiced as part of an overall process for producing a low colored emulsion of functionalized polyolefin wax. This overall process would comprise the steps of firstly functionalizing a polyolefin wax, secondly emulsifying the functionalized polyolefin and thirdly reducing the color of the emulsion of functionalized polyolefin wax according to the present process.

Functionalization of polyolefins can be accomplished by the addition of carboxylic acid groups to or the oxidation of a polyolefin. Oxidation is accomplished by various air oxidation methods which employ steps for hydrogenating and oxidizing low molecular weight polyolefin fragments. The addition of dicarboxylic anhydride/acid groups to polyolefins is accomplished by reacting low molecular weight polyolefins with ethylenically unsaturated polycarboxylic acid, anhydrides or esters thereof, in the presence of a free radical source. The functionalization methods disclosed in U.S. Pat. Nos. 3,329,667; 3,519,588; 2,879,239; 3,480,580 and 3,642,722 are incorporated herein by reference in their entirety. The emulsification step is accomplished by various techniques including adding molten functionalized wax to hot aqueous surfactant solution, adding hot aqueous surfactant solution to molten functionalized wax, or using pressure equipment if the wax melt point is greater than the boiling point of water. The emulsion mixture is typically stirred for about 30 minutes prior to the cool-down phase. The herein disclosed method for reducing the color of an emulsion of functionalized polyolefin wax can be conducted during the cool-down phase of the emulsification process or it can be conducted subsequent to cool-down.

The applicants have developed a method for determining the color of wax emulsions using known comparative reflectance spectra. The standard Commission Internationale De L'Eclairage (CIE) colorimetric value, ("C*"), the correlate of perceived chroma, is calculated from these reflectance measurements. In these wax emulsion measurements, color improvement results in an increase in the C* value for the emulsion. This method is explained in further detail below in the Experimental section of this application.

The emulsion of functionalized polyolefin wax produced according to the present invention will preferably have an essentially colorless translucent appearance having a C* value of at least 8.5, an average particle diameter less than 0.1 micron and a polydispersity of less than 0.5. The molecular weight (weight average) of the functionalized polyolefin wax suspended in the emulsion will typically be greater than 1,000, preferably greater than 2,000.

Any improvement in the C* value of the emulsion is useful. This C* value can easily be raised to at least 6, but is preferably raised to 8.5, with a C* value of at least 10 being more preferred. In some instances, the C* value can be 11 and even well above 11.

The low colored emulsion produced according to the present invention can be added to floor polish formulations to yield a floor polish product having the aesthetically pleasing essentially white color desired for marketability of floor polish which also dries to a durable, buffable, scuff resistant and slip resistant film of floor polish when applied to a floor.

The following examples are intended to illustrate the present invention but should not be interpreted as a limitation upon the reasonable scope thereof.

EXAMPLES

The materials and test procedures used for the results shown herein are shown as follows:

EPOLENE E-43 is a maleated polypropylene wax from Eastman Chemical Company with typical properties including a Gardner Color of 11, acid number of 47, Mw of 9100, ring and ball softening point of 157° C. and specific gravity of 0.934.

EPOLENE E-10 is an oxidized polyethylene wax from Eastman Chemical Company with typical properties including a Gardner Color of 2, acid number of 15, Mw of 6100, ring and ball softening point of 106° C. and specific gravity of 0.942.

EPOLENE E-14 is an oxidized polyethylene wax from Eastman Chemical Company with typical properties including a Gardner Color of 2, acid number of 16, Mw of 3600, ring and ball softening point of 104° C. and specific gravity of 0.939.

EPOLENE E-15 is an oxidized polyethylene wax from Eastman Chemical Company with typical properties including a Gardner Color of 2, acid number of 16, Mw of 4200, ring and ball softening point of 100° C. and specific gravity of 0.925.

EPOLENE E-20 is an oxidized polyethylene wax from Eastman Chemical Company with typical properties including a Gardner Color of 2, acid number of 17, Mw of 7500, ring and ball softening point of 111° C. and specific gravity of 0.960.

AC-540 is an ethylene/acrylic copolymer wax from Allied Signal, Inc., with typical properties including an acid number of 40, Mettler drop point (ASTM D3954) of 108° C., and specific gravity of 0.93.

AC-392 is a high density oxidized ethylene homopolymer wax from Allied Signal, Inc., with typical properties including an acid number of 30, Mettler drop point of 138° C., and specific gravity of 0.99.

IGEPAL CO-710 and CO-630 are ethoxylated nonylphenol surfactants from Rhone-Poulenc which have hydrophilic-lipophilic balance (HLB) values of 13.6 and 13.0, respectively.

Unreacted hydrogen peroxide was determined using cerium sulfate titration with a Ferrion indicator obtained from Aldrich.

Colorimetric values for each wax emulsion sample were determined using a reflectance method developed by the applicants. Approximately 70 mL of emulsion was poured into a sample cell having an optically flat bottom useful for spectral measurements. The petri dish-shaped sample cell was ca. 8.5 cm in diameter and 2 cm deep. The optically flat bottom plate was approximately 4 mm thick. The same sample cell was used for all colorimetric evaluations, and was washed with deionized water and blown dry with nitrogen between sample evaluations. A standard background consisting of the white portion of a Form 2A Opacity Chart obtained from the Leneta Company was placed over the top of each emulsion for each measurement to minimize the effect of the differences in sample transmission and variability in the total sample volume from aliquot to aliquot and sample to sample. The reflectance spectra were measured using a Minolta CM-2002 Reflectance Spectrometer. Simultaneous and essentially instantaneous illumination and detection throughout the visible spectral region (400 to 700 nm) was achieved with a pulsed xenon arc lamp and a silicon photodiode array with a spectral filter array. Specular reflection was excluded by means of an internal light trap. Five arbitrary measurements were made of each sample aliquot over different regions of the sample container, and the averages of these five measurements were reported.

The standard Commission Internationale De L'Eclairage (CIE) colorimetric value C*, the correlate of perceived chroma, for the D65 standard illuminant and the 10 degree standard observer was calculated from the reflectance spectrum. The value of C* for wax emulsions was dominated by the b* chromatic value which is the yellow-blue contribution to the total appearance. In these wax emulsion measurements, color improvement resulted in an increase in the C* value for the emulsion. The ideal bluish-white translucent appearance of a ca. 25 percent solids non-ionic emulsion of AC-540 had a C* value of ca. 14.2.

Particle size was determined by quasi-elastic light scattering experiments. The neat emulsions were diluted in deionized water prior to measurement.

Individual ingredient levels in emulsion recipes are reported as parts by weight. Weight percent can be determined for each ingredient by dividing the parts by weight by the sum of all the ingredients' parts by weight, and multiplying by 100 percent.

Example 1

This example illustrates that significant color reduction is effected by the addition of aqueous solutions of hydrogen peroxide to emulsions of maleated polypropylene at room temperature and pressure.

A large batch of typical maleated polypropylene wax non-ionic emulsion, consisting of 40 parts (by weight) of Epolene E-43, 12 parts Igepal CO-630, 3.6 parts potassium hydroxide (87 percent), and 84 parts of deionized water was prepared according to the "direct pressure" technique. A series of samples were prepared by stirring the appropriate amount of aqueous hydrogen peroxide solution (30 percent $H_2O_2$) into aliquots of the emulsion previously placed in 8 oz. sample jars. Controls at each hydrogen peroxide level were also prepared by diluting separate emulsion aliquots with comparable amounts of deionized water. The CIE chromaticity value, C*, using the D65 illuminant and 10 degree observer for each emulsion was evaluated the day the samples were prepared, and after seven days. Significant bubbling occurred in samples containing 5 and 10 grams of added hydrogen peroxide solution, and the seven day time frame was chosen since bubbling had sufficiently diminished by that time so that colorimetry could be performed without significant interference from bubbles in the emulsion. Examination of the emulsions by eye showed that significant color reduction had occurred relative to the controls, and the extent of color reduction followed the amount of hydrogen peroxide added. These results are shown in Table I.

TABLE I

| Sample | gram E-43 Emulsion | gram water added | gram $H_2O_2$ solution (30%) added | C* Day 1 | C* Day 7 | % $H_2O_2$ unreacted Day 7 | pH |
|---|---|---|---|---|---|---|---|
| 1 | 100 | 0 | 0 | 4.62 | 4.91 | NA | NA |
| 2 | 100 | 1 | 0 | 4.72 | 5.01 | NA | NA |
| 3 | 100 | 0 | 1 | 5.01 | 8.83 | 14 | NA |
| 4 | 100 | 5 | 0 | 5.02 | 5.37 | NA | 9.5 |
| 5 | 100 | 0 | 5 | 5.60 | 10.64 | 9 | 9 |
| 6 | 100 | 10 | 0 | 5.33 | 5.70 | NA | NA |
| 7 | 100 | 0 | 10 | 6.10 | 11.25 | 3 | NA |

This example clearly shows the unexpectedly high degree of color reduction effected by the addition of aqueous solutions of hydrogen peroxide to emulsion of maleated polypropylene at room temperature. Note: A higher C* value relates to a more favorable appearance. A high C* value correlates to blue/white or water/white.

Example 2

This example illustrates that significant color reduction of an emulsion of maleated polypropylene is effected by adding aqueous hydrogen peroxide at room temperature in the absence of ultraviolet light.

Four samples taken from the batch of typical nonionic emulsion of E-43 used in Example 1 were prepared by placing 6 g of the E-43 emulsion in each of four 4 dram vials. Two of the four vials were wrapped with aluminum foil to exclude light. One of the aluminum foil wrapped vials and one of the unwrapped vials served as controls, and 0.5 g of deionized water were added to each. To the other two vials, 0.5 g of 30 percent aqueous hydrogen peroxide were added. Each of the four samples were gently shaken to homogenize and were then set aside. After three days, the aluminum wrapping was removed and the samples were visually compared.

Both of the samples which contained hydrogen peroxide were significantly lighter in color than the control samples. Also, there was no obvious difference between the hydrogen peroxide containing sample exposed to light and the one wrapped with aluminum foil.

Example 3

This example illustrates that color reduction using hydrogen peroxide occurs with the formation of oxygen gas, and that formation of this gas is not due to reaction with the surfactant in the wax emulsion.

A 50 ml aliquot of the batch of nonionic emulsion of E-43 used in Example 1 was placed in a 100 ml flask. The sample was purged with nitrogen and sealed with a rubber septum. The contents were stirred via a magnetic stir bar at room temperature. A syringe was used to transfer 3 ml of 30 percent aqueous hydrogen peroxide to the emulsion sample in the flask. The emulsion sample was stirred continuously for two hours at which point the headspace over the emulsion was analyzed for gas composition. In addition to nitrogen, oxygen gas was found. Carbon dioxide and carbon monoxide were not present. The initial brown color of the emulsion had faded such that the emulsion was practically water white.

A control run consisting of the emulsion ingredients of surfactant, water, and base (i.e., in the absence of wax) was also run with 3 ml of 30 percent aqueous hydrogen peroxide under identical conditions. The initially clear mixture remained clear, and headspace analysis showed only the presence of nitrogen with only the slightest trace of oxygen gas.

Example 4

This example illustrates that aqueous hydrogen peroxide is effective in reducing the color of emulsions of oxidized polyethylene waxes.

Emulsions of Epolene E-10, Epolene E-14, Epolene E-15, and Epolene E-20 were prepared using the "direct pressure" technique according to the typical formulation recipe of 40 parts wax, 12 parts Igepal CO-710, 1 part KOH (87 percent), and 0.4 parts of sodium metabisulfite. Control samples were prepared by diluting 50 g of each emulsion with 5 g of deionized water in 8 oz sample jars. Hydrogen peroxide treated samples were prepared by adding 5 g of 30 percent aqueous hydrogen peroxide to 50 g of each emulsion in 8 oz. sample jars. All samples were prepared and maintained at room temperature. After seven days, the peroxide treated samples were visually compared with their respective controls. All emulsions containing the hydrogen peroxide showed significant reduction in color without any apparent change in viscosity. After a month, however, the Epolene E-15 emulsion treated with hydrogen peroxide had significantly gelled.

Example 5

This example demonstrates that hydrogen peroxide is useful in reducing color of high density oxidized polyethylene wax emulsions.

An emulsion of Allied Signal, Inc., AC-392 was prepared using the "direct pressure" technique according to the typical formulation recipe consisting of 40 parts wax, 12 parts Igepal CO-710, 1.5 parts KOH (87 percent), 0.4 parts of sodium metabisulfite, and 99 parts of deionized water. A control sample was prepared by diluting 50 g of the AC-392 wax emulsion with 5 g of deionized water in an 8 oz. sample jar. A hydrogen peroxide treated sample was prepared by adding 5 g of 30 percent aqueous hydrogen peroxide to 50 g of AC-392 emulsion in an 8 oz. sample jar. Both control and sample preparations were made and maintained at room temperature. After a period of only one hour visual comparison between the peroxide treated sample and the control showed that hydrogen peroxide was effectively improving the emulsion color. However, as time passed :the viscosity of the peroxide treated emulsion increased until, after seven days, the emulsion was a viscous gel.

Example 6

This example demonstrates that aqueous hydrogen peroxide is effective in reducing the color of emulsions of maleated polypropylene waxes, even in the presence of a strong reducing agent, sodium metabisulfite.

An emulsion was prepared by adding 0.4 parts sodium metabisulfite to the batch of E-43 used in Example 1. A series of samples were prepared from this emulsion by stirring appropriate amounts of aqueous hydrogen peroxide solution (30 percent $H_2O_2$) into aliquots of the emulsion in 8 oz. sample jars. Controls at each hydrogen peroxide level were also prepared by diluting separate emulsion aliquots with comparable amounts of deionized water. The chromaticity value for each emulsion was evaluated the day the samples were prepared, and after seven days. The data are presented in Table II.

TABLE II

| Sample | gram Emulsion | gram water | gram $H_2O_2$ solution (30%) added | C* Day 1 | C* Day 7 | % $H_2O_2$ unreacted Day 7 |
| --- | --- | --- | --- | --- | --- | --- |
| 1 | 100 | 0 | 0 | 7.63 | 7.78 | NA |
| 2 | 100 | 1 | 0 | 7.69 | 7.85 | NA |
| 3 | 100 | 0 | 1 | 7.85 | 10.0 | 14 |
| 4 | 100 | 5 | 0 | 7.86 | 8.05 | NA |
| 5 | 100 | 0 | 5 | 8.11 | 11.07 | 12 |
| 6 | 100 | 10 | 0 | 8.07 | 8.29 | NA |
| 7 | 100 | 0 | 10 | 8.47 | 11.58 | 15 |

This example clearly shows that although the initial emulsion color of an emulsion containing sodium metabisulfite is both visually and instrumentally superior to emulsions prepared without sodium metabisulfite in Example 1, the final emulsion color upon treatment with hydrogen peroxide is surprisingly not significantly improved by the presence of sodium metabisulfite.

Example 7

This example illustrates that sodium hypochlorite is useful to reduce color of maleated polypropylene emulsions, but not as useful as hydrogen peroxide.

20 g of 10 percent sodium hypochlorite solution was stirred into 100 g of the E-43 emulsion batch used in Example 1 in an 8 oz sample jar. A control consisting of 20 g of deionized water added to 100 g of emulsion was prepared in a separate sample jar. The emulsion color of the sample began decreasing immediately upon addition of the hypochlorite, but gradually increased with time. After seven days, the C* value of the control was 6.94, and C* for the hypochlorite treated sample was 7.17, on the threshold of detectability.

Example 8

This example illustrates that ozone is effective at reducing the color of maleated polypropylene emulsions.

A typical nonionic emulsion of maleated polypropylene, consisting of 40 parts Epolene E-43, 12 parts Igepal CO-630, 3.6 parts potassium hydroxide (87 percent), and 130 parts of deionized water was prepared. 100 ml of E-43 emulsion was placed in a 200 ml flask fitted with a gas dispersion stone and connected to an ozone generator. Air containing approximately 2.3 g/hr ozone was bubbled through the emulsion at room temperature for one hour. The resulting emulsion had lost it's initial brown color and was a transparent water white color after treatment.

Example 9

This example illustrates that this invention is useful in reducing the color of functionalized amorphous polyolefins.

A typical nonionic emulsion was prepared of a maleated amorphous propylene/ethylene copolymer, consisting of 40 parts wax, 12 parts Igepal CO-630, 5 parts potassium hydroxide (87 percent), and 133 parts of deionized water, using the "direct pressure" technique. The amorphous copolymer, EASTOFLEX P1023, is commercially available from Eastman Chemical Company. P1023 was maleated in a batch process at 195° C. under a nitrogen blanket with constant stirring. The polymer was brought up to temperature, and a mixture of 14 parts maleic anhydride, 3.2 parts di-t-butyl peroxide, and 1 part by weight tetralin (chain transfer agent) was slowly dripped into the molten polymer from a dropping funnel. After workup, the polymer had an acid number of 58 mg KOH/g polymer and a melt viscosity of 450 cp at 190° C. The emulsion prepared from this maleated amorphous polymer was brown and translucent in appearance, and a 100 ml aliquot of the emulsion was treated with ozone according to the procedure described in Example 8 to yield a white translucent emulsion.

This example clearly shows that this process significantly reduced the color of typical emulsions of functionalized amorphous polyolefins.

Example 10

This example illustrates that this process can be practiced by addition of the oxidizing agent during the emulsification cool-down cycle.

190 g of the E-43 emulsion used in Example 1 was charged to a 300 ml stirred stainless steel pressure reactor. The reactor was sealed and heated to 90° C. with constant stirring in order to achieve typical emulsification conditions. Once at temperature, the heating mantle was removed, the reactor unsealed, and 10 g of 30 percent aqueous hydrogen peroxide was poured into the emulsion. The reactor was then sealed again and left to cool with stirring. As in a typical emulsification cool-down cycle, it took ca. 2 hours to cool from 90° C. down to 40° C., accomplished without running cooling water to expedite the cooling process. A pressure buildup of 70 psi occurred, and this was vented prior to opening the reactor. Upon opening the reactor, quite a bit of foam was evident, and the resulting emulsion color was significantly reduced.

Example 11

This example illustrates that at low pH, low reaction temperature, and with reaction permitted to occur only for 30 minutes, significant color reduction occurs when a maleated polypropylene emulsion is treated with low levels of hydrogen peroxide solution.

A 3 gallon batch of Epolene E-43 nonionic emulsion was prepared according a typical formulation consisting of 40 parts Epolene E-43 wax, 12 parts Igepal CO-630, a little less than 3.6 parts potassium hydroxide (87 percent), and 84 parts of deionized water was prepared by the "direct pressure" technique. 400 grams of E-43 emulsion was removed from the bulk batch and titrated with 2N KOH solution until the emulsion pH was 9.5. This titrated emulsion was then split, with 198 g being charged to the pressure reactor and 198 g placed in a sample jar along with 2 g of deionized water. This water-diluted sample served as the reference for the color measurement of the peroxide-treated sample. The water-diluted standard had a C* value (D65 illuminant, 10° observer) of 6.18.

After charging with the emulsion, the pressure reactor was sealed and heated with stirring to the run temperature of 50° C. Once at temperature, the pressure vessel was unsealed, opened and 2 g of 30 percent aqueous hydrogen peroxide solution was poured in, resulting in a weight concentration of hydrogen peroxide in the emulsion of 0.3 weight percent.

The pressure vessel was immediately resealed, and temperature was maintained for 30 minutes. Stirring was maintained at a fixed rate except when the peroxide was actually added. The pressure increase was monitored via an attached pressure gauge, and the maximum pressure buildup of 5 psi occurred ca. 15 minutes after adding the hydrogen peroxide. At the end of the 30 minute reaction time, the heating mantle was removed and water run through the cooling coils in the reactor until the temperature was below 40° C. The excess pressure was then carefully bled off, the reactor opened, and the contents poured into a sample jar.

The dispersion pH after reaction, and residual peroxide were evaluated immediately after preparation. The emulsion pH decreased from 9.5 to 8.8 upon treatment with hydrogen peroxide, and ca. 30 percent of the originally added hydrogen peroxide remained in solution after reaction. The hydrogen peroxide-treated sample had a C* value of 8.00. The effective particle diameter of the emulsion particles was measured to be 53.8 nm.

This example clearly shows that the color of a typical emulsion of maleated polypropylene is unexpectedly significantly reduced at a low concentration of $H_2O_2$ at a low temperature and a short reaction time.

Example 12

This example illustrates that at high pH, high reaction temperature, and with a long reaction time significant color reduction occurs when a maleated polypropylene emulsion is treated with high levels of hydrogen peroxide solution.

A 400 g aliquot of the batch emulsion from Example 11 was titrated to pH 11 with 2N KOH. This titrated emulsion was then split, with 180 g being charged to the pressure reactor and 180 g placed in a sample jar along with 20 g of deionized water. This water-diluted sample served as the reference for the color measurement of the peroxide-treated sample. The water-diluted standard had a C* value (D65 illuminant, 10° observer) of 6.22.

After charging with the emulsion, the pressure reactor was sealed and heated with stirring to the run temperature of 90° C. Once at temperature, the pressure vessel was unsealed, opened and 20 g of 30 percent aqueous hydrogen peroxide solution was poured in, resulting in a weight concentration of hydrogen peroxide in the emulsion of 3 weight percent. The pressure vessel was immediately resealed, and temperature was maintained for 90 minutes. Stirring was maintained at a fixed rate except when the peroxide was actually added. The pressure increase was monitored via an attached pressure gauge, and the maximum pressure buildup of 220 psi occurred ca. 15 minutes after adding the hydrogen peroxide. At the end of the reaction time, the heating mantle was removed and water run through the cooling coils in the reactor until the temperature was below 40° C. The excess pressure was then carefully bled off, the reactor opened, and the contents poured into a sample jar.

The dispersion pH after reaction, and residual peroxide were evaluated immediately after preparation. The emulsion pH decreased from 11 to 8.1 upon treatment with hydrogen peroxide, and ca. 1.3 percent of the originally added hydrogen peroxide remained in solution after reaction. The hydrogen peroxide-treated sample had a C* value of 10.84. The effective diameter of the resultant emulsion particles was measured to be 63.8 nm.

Example 13

This example illustrates that at a medium pH, medium reaction temperature, and with an hour reaction time, significant color reduction occurs when a maleated polypropylene emulsion is treated with high levels of hydrogen peroxide solution.

A 400 g aliquot of the batch emulsion from Example 11 was titrated to pH 10.3 with 2N KOH. This titrated emulsion was then split, with 189 g being charged to the pressure reactor and 180 g placed in a sample jar along with 11 g of deionized water. This water-diluted sample served as the reference for the color measurement of the peroxide-treated sample. The water-diluted standard had a C* value (D65 illuminant, 10° observer) of 6.70.

After charging with the emulsion, the pressure reactor was sealed and heated with stirring to the run temperature of 70° C. Once at temperature, the pressure vessel was unsealed, opened and 11 g of 30 percent aqueous hydrogen peroxide solution was poured in, resulting in a weight concentration of hydrogen peroxide in the emulsion of 1.7 weight percent. The pressure vessel was immediately resealed, and temperature was maintained for 60 minutes. Stirring was maintained at a fixed rate except when the peroxide was actually added. The pressure increase was monitored via an attached pressure gauge, and the maximum pressure buildup of 120 psi occurred ca. 15 minutes after adding the hydrogen peroxide. At the end of the reaction time, the heating mantle was removed and water run through the cooling coils in the reactor until the temperature was below 40° C. The excess pressure was then carefully bled off, the reactor opened, and the contents poured into a sample jar.

The dispersion pH after reaction, and residual peroxide were evaluated immediately after preparation. The emulsion pH decreased from 10.3 to 8.9 upon treatment with hydrogen peroxide, and ca. 5.15 percent of the originally added hydrogen peroxide remained in solution after reaction. The hydrogen peroxide-treated sample had a C* value of 10.79. The effective diameter of the resultant emulsion particles was measured to be 54.4 nm.

This example clearly shows that there is surprisingly little difference in the degree of emulsion color reduction between the more extreme method reaction conditions of Example 12 and medium reaction conditions of this method.

Example 14

This example illustrates that care must be taken to ensure that the final emulsion pH remains above 8 for nonionic emulsions when treated with hydrogen peroxide solution to reduce emulsion color.

A 400 g aliquot of the batch emulsion from Example 11 was titrated to pH 9.5 with 2N KOH. This titrated emulsion was then split, with 180 g being charged to the pressure reactor and 180 g placed in a sample jar along with 20 g of deionized water. This water-diluted sample served as the reference for the color measurement of the peroxide-treated sample. The water-diluted standard had a C* value (D65 illuminant, 10° observer) of 6.70.

After charging with the emulsion, the pressure reactor was sealed and heated with stirring to the run temperature of 90° C. Once at temperature, the pressure vessel was unsealed, opened and 20 g of 30 percent aqueous hydrogen peroxide solution was poured in, resulting in a weight concentration of hydrogen peroxide in the emulsion of 3 weight percent. The pressure vessel was immediately resealed, and temperature was maintained for 90 minutes. Stirring was maintained at a fixed rate except when the peroxide was actually added. The pressure increase was monitored via an attached pressure gauge, and the maximum pressure buildup of 165 psi occurred ca. 15 minutes after adding the hydrogen peroxide.

At the end of the reaction time, the heating mantle was removed and water run through the cooling coils in the reactor until the temperature was below 40° C. The excess pressure was then carefully bled off, the reactor opened, and the contents poured into a sample jar. The contents of the reactor was highly viscous, comparable in flow behavior to petroleum jelly.

The dispersion pH after reaction, and residual peroxide were evaluated immediately after preparation. The emulsion pH decreased from 9.5 to 7.4 upon treatment with hydrogen peroxide, and ca. 2.8 percent of the originally added hydrogen peroxide remained in solution after reaction. The hydrogen peroxide-treated sample gel had a measured C* value of 10.18, but air bubbles dispersed within the gel likely contribute significantly to experimental error of this sample.

Example 15

This example illustrates the importance of decolorizing the wax only after it has been emulsified by showing that addition of oxidizing bleaching agents during preparation of functionalized polyolefin wax emulsions actually increases the emulsion color rather than decreasing color.

Two nonionic emulsions of Epolene E-43 wax were prepared separately using the same "direct pressure" procedures and equipment. The first emulsion recipe, which served as a control, consisted of 40 parts wax, 12 parts Igepal CO-630, 3.6 parts potassium hydroxide (87 percent), and 83.4 parts of deionized water. The pressure vessel was charged with the ingredients, sealed, heated to 175° C. with constant stirring and left at temperature for 30 minutes. The heating mantle was then removed and cooling water was circulated through coils in the reactor until the product temperature was 40° C. The reactor was then opened and the control emulsion was poured into a glass sample jar. This emulsion had pH after preparation of 9.06, and a CIE C* value (D65 illuminant, 10 degree observer) of 5.02.

The second emulsion, the sample, was prepared according to the recipe of 40 parts of Epolene E-43 wax, 12 parts Igepal CO-630, 3.6 parts potassium hydroxide (87 percent), 1.2 parts of sodium perborate monohydrate, and 85.2 parts deionized water. A mole of perborate yields a mole of sodium metaborate and a mole of hydrogen peroxide in aqueous solution, so on a mass basis the monohydrate material added to the emulsion is approximately 32 percent hydrogen peroxide. Therefore, in this formulation 1.2 parts by weight of sodium perborate monohydrate is equal to approximately 0.3 weight percent in the emulsion. The sample emulsion pH was 9.89, and the CIE C* value (D65 illuminant, 10 degree observer) was 3.36.

Example 16

This example illustrates that practice of this invention to reduce the color of a functionalized wax emulsion does not adversely affect the application performance of the emulsion in floor polish.

Samples 6 and 7 from Example 1 were separately incorporated in a typical commercial floor polish formulation at equal use levels of 2.7 percent of the total polish formula weight. A typical battery of laboratory bench testing on the formulas and on films made from the formulas were performed. The results of these evaluations are shown in Table III, IV, and V. Table III shows the gloss values obtained from dried polish films on standard floor tile substrates using ASTM D532-85 (for 20° evaluation) and ASTM D1455-82 (for 60° evaluation).

TABLE III

| | Polish with Sample 6 | | Polish with Sample 7 | | #Coats on substrate |
|---|---|---|---|---|---|
| Substrate | 20° | 60° | 20° | 60° | |
| Vinyl | 33 | 81 | 29 | 77 | 1 |
| | 64 | 89 | 62 | 89 | 2 |
| Vinyl Composition | 6 | 33 | 11 | 44 | 1 |
| | 25 | 65 | 31 | 69 | 2 |
| | 42 | 79 | 51 | 82 | 3 |
| | 55 | 86 | 63 | 88 | 4 |

This example clearly shows, that with an estimated error in each measurement of ±5 units, there is surprisingly no statistically significant difference in gloss between the floor polish containing untreated Epolene E-43 emulsion (sample 6), and the floor polish containing an emulsion of E-43 which was treated with aqueous hydrogen peroxide (sample 7) to reduce emulsion color.

Polish stability testing data are presented in Table IV, and consists of monitoring polish formulation viscosity (Brookfield) at high temperature (oven stability) and freeze/thaw cycles. For both these stability tests, the polish viscosity should remain below 10 cps, and the estimated error in evaluation is ±1 cps.

TABLE IV

| | | Polish with Sample 6 | Polish with Sample 7 | ASTM Method |
|---|---|---|---|---|
| Heat-aged Stability cps | @60° C. - 1 week | 7 | 6 | D1791-82 |
| | @50° C. - 1 week | 4 | 4 | |
| | 2 week | 4 | 4 | |
| | 3 week | 5 | 5 | |
| | 4 week | 5 | 5 | |
| Freeze/Thaw Stability, cps | | | | D3209-82 |
| | 1 cycle | 3 | 3 | |
| | 2 cycle | 3 | 3 | |
| | 3 cycle | Fail | Fail | |

This example clearly shows that, given the error in the evaluation, there is surprisingly no statistically significant difference in heat-aged or freeze thaw stability between floor polish formulations prepared with the untreated Epolene E-43 emulsion (sample 6), and the emulsion treated with aqueous hydrogen peroxide (sample 7) to reduce emulsion color.

Polish performance bench testing results are shown in Table V:

TABLE V

| Test | | Polish with Sample 6 | Polish with Sample 7 | Method |
|---|---|---|---|---|
| Black Heel Marking Resistance | 1 = poor, 5 = Best ± 1 unit | 3 | 4 | CSMA Bulletin 9-73 |
| Soil Resistance @45°0° | Initial Reflectance Control ± 3 units | 67/67 | 67/67 | ASTM D3206-87 |
| | Reflectance After Soiling ± 3 units | 35/35 | 36/35 | |

TABLE V-continued

| Test | | Polish with Sample 6 | Polish with Sample 7 | Method |
|---|---|---|---|---|
| | % Soiling ± 3 units | 48/48 | 46/48 | |
| Slip Resistance | Underfoot ± 1 unit | 2 | 2 | CSMA Bulletin 245-70 |
| Detergent Resistance | | excellent | excellent | ASTM D3207-82 |
| Leveling | Vinyl | excellent | excellent | ASTM D1436-82 |
| | Vinyl Composition | excellent | excellent | |
| Recoatability | | excellent | excellent | ASTM D3153-78 |
| Removability | | good | good | ASTM D1792-82 |
| Water Resistance | @10 minutes | excellent | excellent | ASTM D 1793-82 |
| | @60 minutes | excellent | excellent | |

This example clearly shows that, given the error in each evaluation, there is surprisingly no statistically significant difference in performance in bench testing between floor polish formulations prepared with the untreated Epolene E-43 emulsion (sample 6), and the emulsion treated with aqueous hydrogen peroxide (sample 7) to reduce emulsion color.

Example 17

This example illustrates that peracetic acid is an effective oxidative bleaching agent useful in the present process to reduce the color of aqueous emulsions of functionalized polyolefins.

Three samples were prepared by adding 10 g of the batch of typical E-43 emulsion used in Example 1 in each of three 4 dram vials. 0.74 g of potassium hydroxide (87.8 percent) was added to one vial and shaken until dissolved. 0.86 g of 35 percent peracetic acid in glacial acetic acid was added to the vial containing the E-43 and KOH mixture and the resulting mixture was shaken gently and placed in a 65° C. water bath. The sample began to bubble as the vial warmed up and the color of the emulsion was significantly reduced after two hours when compared to the untreated control. The emulsion remained a low color fluid emulsion after cooling and storing for 72 hr. at room temperature.

0.86 g of 35 percent peracetic acid was added to the remaining vial containing the E-43 emulsion and the resulting mixture was gently shaken. The mixture formed a low color gel immediately upon shaking.

This example clearly shows that peracetic acid is surprisingly effective at producing a low colored wax emulsion as long as the pH of the emulsion is kept above approximately 8 during treatment of the emulsion with peracetic acid.

Example 18

This example illustrates the strong positive correlation between the amount of color of functionalized wax and emulsion color. More specifically, this example shows that a lower Gardner Color value, the colorimetric value used to measure the amount of color in solid waxes, results in a higher value of C* for a typical emulsion, where the higher value of C* indicates a lower emulsion color. Typical non-ionic emulsions were prepared from each of four lots of Epolene E-43 wax using the "direct pressure" technique consisting of 40 parts by weight of wax, 12 parts of CO-630 surfactant, 27.4 parts of 2.045N KOH solution, 0.4 parts of sodium metabisulfite, and 52.8 parts of deionized water. The wax was taken from four different lots of Epolene E-43 wax having different Gardner color values. Repeat emulsions were prepared for each wax lot to ensure that the observed differences in emulsion C* were not due to variability in preparing the emulsions. A linear least-squares regression fit to a plot of C* as a function of Gardner Color yields the equation C*=−0.61×Gardner Value+11.4, with an r-square for the fit of 0.982. Emulsion pH and the measured C* values are shown in Table VI.

TABLE VI

| Sample | Gardner Color | pH | C* |
|---|---|---|---|
| A1 | 10 | 9.13 | 5.23 |
| A2 | 10 | 8.69 | 5.23 |
| A3 | 10 | 9.33 | 5.17 |
| B1 | 9 | 8.67 | 5.86 |
| B2 | 9 | 8.97 | 6.00 |
| B3 | 9 | 8.82 | 6.05 |
| C1 | 8.5 | 8.87 | 6.28 |
| C2 | 8.5 | 8.83 | 6.41 |
| D1 | 7 | 9.31 | 7.03 |
| D2 | 7 | 8.64 | 7.06 |

Example 19

This example shows that functionalized polypropylene which had a significant amount of color removed via solvent extraction prior to emulsification will produce a highly colored emulsion.

Epolene E-43 pellets were extracted with acetone to remove much of the yellow-brown color. The resulting extracted pellets are significantly more white in appearance, and have a Gardner Color value of 4 after extraction, compared to a typical E-43 Gardner Color value of ca. 9 prior to extraction.

An emulsion of the extracted pellets was prepared according to the "direct pressure" technique consisting of 40 parts by weight of wax pellets, 12 parts Igepal CO-630 surfactant, 2.1 parts of KOH pellets (87 percent), and 81.1 parts deionized water. After preparation, the emulsion was milky and highly colored. The C* value of the emulsion was measured to be 3.51.

This example clearly shows that the emulsification process itself contributes color to the final color of the emulsion.

We claim:

1. A method of reducing the color of a wax emulsion, comprising treating a wax emulsion with a water soluble oxidizing agent at a temperature above the freezing point and below the boiling point of the emulsion and below the softening point of the wax, wherein said wax emulsion contains functionalized polyolefin wax, water and surfactant.

2. The method according to claim 1 wherein said method is conducted in the substantial absence of amines.

3. The method according to claim 1 wherein the oxidizing agent is selected from the group consisting of water soluble peroxide, hypochlorite, perborate, persulfate, ozone and peracetic acid.

4. The method according to claim 3 wherein the oxidizing agent is selected from the group consisting of hydrogen peroxide, alkali metal peroxide, alkali metal hypochlorite, alkali metal perborate and alkali metal persulfate.

5. The method according to claim 4 wherein the oxidizing agent is hydrogen peroxide.

6. The method according to claim 5 wherein hydrogen peroxide is present at a concentration in a range of about 0.1 weight percent to about 20 weight percent based on the total weight of the emulsion.

7. The method according to claim 6 wherein the concentration of hydrogen peroxide is in a range of about 1 weight percent to about 2 weight percent based on the total weight of the emulsion.

8. The method according to claim 1 wherein the emulsion is treated for a time in the range of about 5 minutes to about 7 days.

9. The method according to claim 8 wherein the emulsion is treated for a time in the range of about 10 minutes to about 40 minutes.

10. The method according to claim 1 wherein the temperature is in the range of about 50° C. to about 90° C. and the method is conducted at atmospheric pressure.

11. The method according to claim 1 wherein the functionalized polyolefin wax is selected from the group consisting of oxidized polyethylene and maleated polypropylene, being present in a concentration of at least 20 weight percent, based on the total weight of the emulsion.

12. The method according to claim 1 wherein the emulsion contains about 55 to 70 weight percent water and about 30 to 45 weight percent solids, based on the total weight of the emulsion, prior to treating the emulsion.

13. An essentially colorless emulsion of functionalized polyolefin wax produced according to claim 12, wherein the functionalized polyolefin wax has a weight average molecular weight of at least about 1,000 and the emulsion has an average particle diameter less than about 0.1 micron, a polydispersity value less than about 0.5, and a correlate of perceived chroma value (C*) of at least about 8.5, according to the Commission Internationale De L'Eclairage (CIE) colorimetric scale, determined using the D65 standard illuminant and the 10 degree standard observer.

14. A composition comprising an essentially colorless emulsion having a translucent appearance and having a correlate of perceived chroma value (C*) of at least 8.5, according to the Commission Internationale De L'Eclairage (CIE) colorimetric scale, determined using the D65 standard illuminant and the 10 degree standard observer, said emulsion comprising:

(a) at least 55 weight percent water, based on the total weight of the emulsion;

(b) at least 20 weight percent, based on the total weight of the emulsion, of suspended particles of maleated polypropylene wax having an average particle diameter less than about 0.1 micron, said functionalized polyolefin wax having a polydispersity index of less than 0.5 and a weight average molecular weight of at least 1,000; and (c) a surfactant.

15. The composition according to claim 14 wherein the emulsion contains about 30 to 45 weight percent solids and said maleated polypropylene wax has a weight average molecular weight of at least 2,000.

* * * * *